United States Patent [19]
Buehring et al.

[11] Patent Number: 6,162,865
[45] Date of Patent: *Dec. 19, 2000

[54] HIGH-FREQUENCY-WELDABLE POLYMER MIXTURE

[75] Inventors: Juergen Buehring, Langenhagen; Albrecht Sluka, Goeppingen, both of Germany

[73] Assignee: Benecke-Kaliko AG, Hannover, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/995,344

[22] Filed: Dec. 22, 1997

[30] Foreign Application Priority Data

Dec. 20, 1996 [DE] Germany ............................ 196 53 590

[51] Int. Cl.$^7$ .............................. C08L 77/00; C08L 23/12
[52] U.S. Cl. .......................... 525/66; 525/92 B; 525/179; 525/183
[58] Field of Search ................................... 525/66, 92 B, 525/179, 183

[56] References Cited

U.S. PATENT DOCUMENTS 5,179,164  1/1993  Lausberg ................................. 525/179

FOREIGN PATENT DOCUMENTS

| 346148 | 12/1989 | European Pat. Off. ................. 525/66 |
| 0688821 | 12/1995 | European Pat. Off. . |
| 41 42 271 | 6/1993 | Germany . |
| 149940 | 9/1984 | Japan ...................................... 525/66 |
| 110740 | 6/1985 | Japan ...................................... 525/66 |
| 028539 | 2/1986 | Japan ...................................... 525/66 |
| 065168 | 3/1989 | Japan ...................................... 525/66 |

*Primary Examiner*—David J. Buttner
*Attorney, Agent, or Firm*—Reed Smith LLP

[57] ABSTRACT

High-frequency-weldable polymer mixture containing: a copolymer of ethylene with comonomers selected from vinyl esters of saturated $C_2$–$C_8$ carboxylic acids, $C_1$–$C_{12}$-alkyl acrylates and -methacrylates, optionally with carbon monoxide as termonomer; and polyamide-containing thermoplastic polyolefin which, in turn, contains a polyamide, polyolefin and, optionally, compatibilizing agents. The polyolefins can be a propylene copolymer with polypropylene blocks and random copolymer blocks, or a mixture of polypropylene and random copolymers. The polymer mixture has good high-frequency weldability and good weld seam strength as well as thermal stability accompanied by a low temperature dependency of the dielectric loss factor.

8 Claims, No Drawings

HIGH-FREQUENCY-WELDABLE POLYMER MIXTURE

BACKGROUND OF THE INVENTION

1. Field of the Invention

The invention is directed to a high-frequency-weldable polymer mixture and to sheets or molded articles containing this polymer mixture.

2. Description of the Related Art

It is known that plastics parts can be welded in the high-frequency field. In this case, thermoplastic parts in the form of sheets or molded articles to be connected are heated to the required welding temperature in the capacitor field of a high-frequency voltage source without an auxiliary die. The sheets are seam-welded (overlapping seams welded so as to withstand shearing stress or peeling stress). High-frequency-weldable materials are, above all, thermoplastics with a polar makeup, i.e., plastics in which are built in molecules, atoms or side groups which cause a charge transfer in the molecule (dipoles). When a thermoplastic of this kind enters a high-frequency alternating field, the polar groupings carry out oscillations corresponding to the excitation frequency. The oscillations lead to heat development in the plastic. The dielectric loss factor tan $\delta$ is generally used as a characteristic value for the transformation of electric field energy into heat. As a rule, the sheets are not connected along the entire surface. Welding is generally restricted to line-type or frame-type contours and heating is restricted to the respective welding web region.

However, because of their nonpolar character, polyolefins cannot be processed in this way. In order to be able to weld polyolefins in the high-frequency field also, U.S. Pat. No. 3,336,173 proposes mixing in polyamides with the polyolefins. However, molded articles made from such materials have the disadvantage that the obtained weld seams do not have adequate strength or that tearing occurs next to the weld seam.

EP-A-0 406 568 describes a polypropylene-polyamide molded compound which, in addition to a polypropylene homopolymer and/or a polypropylene copolymer and a polyamide, contains an olefinic unsaturated carboxylic acid and/or an olefinic unsaturated carboxylic acid derivative. EP-A-0 406 568 contains no reference to the high-frequency weldability of the described molded compound.

DE-A-41 42 271 describes molded articles which contain essentially polyolefins, polyamides and adhesion promoters or bonding agents. The bonding agent is preferably a copolymer of styrene and ethylene butylene blocks grafted with maleic anhydride.

The known propylene-polyamide compounds have the disadvantage that they have a low dielectric loss factor at room temperature, as a result of which they can only absorb small amounts of energy in the high-frequency alternating field. Therefore, a disadvantageously high energy input and high welding power are required for welding this material. On the other hand, the dielectric loss factor increases sharply as the heating of the material caused by the absorption of energy in the high-frequency field increases, resulting in a significant drop in the breakdown voltage or dielectric strength and an increased risk of dielectric breakdown. This leads to an increased reject rate.

Further, it is known that copolymers of ethylene and vinyl acetate are high-frequency-weldable. For example, JP-A-06287362 discloses a high-frequency weldable mixture of polyolefins with ethylene vinyl acetate copolymers (EVA). However, molded articles made from mixtures of this kind have only a limited thermal dimensional stability. Sheets made from such mixtures with a high EVA content tend to stick together at elevated temperatures.

OBJECT AND SUMMARY OF THE INVENTION

Therefore, the primary object of the invention is to provide a polymer mixture which has a sufficient high-frequency weldability and good weld seam strength as well as thermal stability accompanied by a low temperature dependency of the dielectric loss factor.

This object is met, according to the invention, by a high-frequency-weldable polymer mixture containing the following components a) and b):

a) approximately 1 to 80 percent by weight (i) copolymer of ethylene with approximately 8 to 45 percent by weight comonomers selected from vinyl esters of saturated $C_2$–$C_8$ carboxylic acids, $C_1$–$C_{12}$-alkyl acrylates and -methacrylates, optionally with carbon monoxide as termonomer, or (ii) ethylene homopolymers, ethylene copolymers, propylene homopolymers and/or propylene copolymers with approximately 8 to 45 percent by weight grafted units of unsaturated carboxylic acids, dicarboxylic acids, their esters and/or anhydrides, or (iii) a mixture of (i) and (ii), in each case with a melt-flow index MFI (190° C.; 2.16 kg) of approximately 0.2 to 7.0 g/10 min;

b) approximately 20 to 99 percent by weight polyamide-containing thermoplastic polyolefins with a melt-flow index MFI (230° C. 2.16 kg) of approximately 0.5 to 7.0 g/10 min containing:

aa) approximately 3 to 50 percent by weight polyamide, bb) approximately 50 to 97 percent by weight polyolefin, which polyolefin (i) is a propylene copolymer of which approximately 10 to 95 percent by weight are one or more polypropylene blocks and approximately 90 to 5 percent by weight are one or more random copolymer blocks of ethylene, $C_3$–$C_{12}$-$\alpha$-olefin and, optionally, diene, wherein the ethylene content in the random copolymer blocks is approximately 50 to 95 percent by weight, or (ii) a mixture of a polypropylene and a copolymer of ethylene, $C_3$–$C_{12}$-$\alpha$-olefin and, optionally, diene, wherein the weight ratio of polypropylene to copolymer is approximately 9:1 to 1:9, or (iii) a mixture of (i) and (ii), cc) approximately 0 to 40 percent by weight compatibilizing agent, wherein the quantities of aa) to cc) add up to 100 percent by weight and are referenced to component b), and quantities a) and b) are referenced to the sum of a)+b).

The mixture preferably contains approximately 15 to 70 percent by weight of component a) and approximately 30 to 85 percent by weight of component b).

In a preferred embodiment form, the polymer mixture according to the invention additionally comprises up to approximately 20 percent by weight to 100 percent by weight of components a)+b), a partially crosslinked TPE with a melt-flow index MFI (230° C.; 10 kg) of approximately 5 to 30 g/10 min.

In another preferred embodiment form, the polymer mixture according to the invention contains, in addition, up to approximately 20 percent by weight to 100 percent by weight of components a)+b), of a copolymer of ethylene with approximately 12 to 30 percent by weight $C_3$–$C_{12}$-$\alpha$-olefin with a melt-flow index MFI (190° C.; 2.16 kg) of approximately 0.2 to 7.0 g/10 min.

In a further preferred embodiment form, the polymer mixture according to the invention additionally contains up to approximately 20 percent by weight to 100 percent by weight of components a)+b) of a polyethylene with a density of 0.933 to 0.966 g/cm$^3$, and a melt-flow index MFI (190° C.; 2.16 kg) of approximately 0.2 to 5.0 g/10 min.

The polymer mixture according to the invention contains, as component a), a copolymer of ethylene with a polar comonomer. The content of polar monomer units is between 8 and 45 percent by weight, especially between approximately 14 and 35 percent by weight. The MFI value (190° C.; 2.16 kg) is between approximately 0.2 and 7.0 g/10 min, preferably between approximately 0.3 and 4.0 g/10 min. Vinyl esters of a saturated carboxylic acid with 2 to 12 carbon atoms and/or alkyl acrylates or -methacrylates with 1 to 12 carbon atoms in the alkyl group can be used as polar comonomers. Preferred examples are ethylene vinyl acetate copolymers, ethylene methacrylate copolymers, ethylene ethyl acrylate copolymers and/or ethylene butyl acrylate copolymers. Further, (ter)polymers comprising ethylene, one or more of the comonomers mentioned above, and carbon monoxide can be used, wherein the individual monomer units are randomly distributed over the polymer chain. A preferred example is ethylene vinyl acetate carbon monoxide terpolymers. Further, graft polymers of ethylene homopolymers or ethylene copolymers or propylene homopolymers or propylene copolymers can be used as component a), wherein unsaturated carboxylic acids, dicarboxylic acids, esters and/or anhydrides thereof can be used as graft monomers. Ethylene homopolymers or ethylene copolymers grafted with maleic anhydride are especially preferred. Mixtures of the above-mentioned copolymers, terpolymers or graft polymers can also be used.

Component b) of the polymer mixture according to the invention has a polyamide component and a propylene component. The employed polyamide can be an amorphous or partially crystalline polyamide, wherein partially crystalline polyamides are preferred because of their thermal dimensional stability. The polyamide preferably has a molecular weight of at least approximately 5000. The polyamides can be produced by polycondensation of equimolar amounts of saturated dicarboxylic acids with 4 to 12 carbon atoms, preferably 6 to 12 carbon atoms, per molecule with a diamine containing 4 to 12 carbon atoms per molecule. Suitable polyamides can also be produced by ring-opening polymerization of lactams. Examples of suitable polyamides include polyhexamethylene adipic acid amide (Nylon 6,6), polyhexamethylene sebacic acid amide (Nylon 6,10), polyhexamethylene dodecane dicarboxylic acid amide (Nylon 6,12), poly-$\epsilon$-caprolactam (Nylon 6) or polylauric acid lactam.

Further, polyamides which have been produced by copolycondensation of at least two of the above-mentioned polymers or their synthesis components can also be used. The polyamides are preferably linear and have a melting point above approximately 200° C. The polyamide content with reference to component b) is approximately 3 to 50 percent by weight, preferably approximately 5 to 35 percent by weight.

In one embodiment form, the polyolefinic component of component b) is a propylene copolymer of which, in turn, approximately 10 to 95 percent by weight, preferably approximately 30 to 70 percent by weight, are one or more polypropylene blocks and approximately 90 to 5 percent by weight, preferably approximately 70 to 30 percent by weight, are one or more random copolymer blocks of ethylene, $C_3$–$C_{12}$-$\alpha$-olefin, and optionally diene, wherein the ethylene content in the random copolymer blocks is approximately 50 to 95 percent by weight, preferably approximately 50 to 85 percent by weight. The polypropylene blocks are either propylene homopolymer blocks or propylene copolymer blocks with a predominant propylene proportion which, in addition to propylene, can contain less than approximately 30 percent by weight, preferably less than approximately 20 percent by weight, especially less than approximately 10 percent by weight and especially preferably less than approximately 5 percent by weight ethylene or $C_4$–$C_8$-$\alpha$-olefin. The melting point of the polypropylene block should preferably be above approximately 130° C., especially above approximately 140° C. The melting point of the polypropylene block in the propylene copolymer can be determined by DSC (Differential Scanning Calorimetry). On the one hand, the propylene copolymer can be a segmented block copolymer in which, e.g., a polypropylene block is flanked on at least one side by a random copolymer block or a random copolymer block is flanked on both sides by polypropylene blocks. On the other hand, however, graft copolymers in which the random copolymer is grafted on a polypropylene skeleton, as well as mixed forms of block copolymers and graft copolymers are also suitable. The propylene copolymers mentioned above exhibit a combination of different mechanical characteristics, especially a high impact toughness accompanied by sufficiently high rigidity. These properties can be obtained in general by methods in which propylene (or an $\alpha$-olefin mixture with a predominant propylene proportion) is initially polymerized in a first reaction step and the resulting (homo)polymer is then introduced in a second reaction step in which a mixture of ethylene, $C_3$–$C_{12}$-$\alpha$-olefin polymerized onto this (homo)polymer. The first reaction step can be carried out generally by Ziegler-Natta catalysis with gaseous propylene or can be carried out by polymerization of propylene in liquid phase in the presence of a solid-phase catalyst. The second reaction step can likewise be a Ziegler-Natta polymerization, but can also make use of anionic polymerization or another mechanism. Suitable processes are disclosed, e.g., in EP-A-0 131 322 and GB-A-2 157 302.

Alternatively, the polyolefinic component of component b) comprises at least a partially crystalline propylene and at least an ethylene copolymer acting as an impact-toughness component. The weight ratio of polypropylene to copolymer in this case is approximately 9:1 to 1:9, preferably 7:3 to 3:7. The polypropylene is a propylene homopolymer or a propylene copolymer which, in addition to propylene, contains less than approximately 30 percent by weight, preferably less than approximately 20 percent by weight, in particular less than 10 percent by weight, and particularly preferably less than approximately 5 percent by weight ethylene or $C_4$–$C_8$-$\alpha$-olefin. The melting point of the polypropylene is preferably above approximately 130° C., especially above approximately 140° C. The polypropylene is preferably isotactic polypropylene or has isotactic sequences. The ethylene copolymer acting as impact-toughness component contains ethylene, a $C_3$–$C_{12}$-$\alpha$-olefin and optionally diene. The ethylene content is preferably approximately 50 to 95 percent by weight, especially approximately 50 to 85 percent by weight. Propylene is normally used as an a-olefin when producing these copolymers; however, 1-butene, 1-pentene, 1-hexene and 4-methylpentene-1 with partial substitution of or in addition to the propylene can also be used in the production of suitable impact-toughness promoting ethylene copolymers. The ethylene copolymers with impact toughness effect preferably have a low gel content. The gel content can be determined by extraction in boiling xylene. A low gel content indicates a low crosslinking density and is characteristic of a polymer with advantageous processing characteristics. The gel content preferably amounts to less than approximately 5 percent by weight. The impact-toughness promoting ethylene copolymer is preferably extensively amorphous. A preferred example is EPM rubber.

Copolymers of ethylene, at least one $C_3$–$C_6$-α-olefin and at least one nonconjugated diene can also be used as an impact toughness component. EPDM is preferred. A particularly preferable class of EPDM contains a monoreactive nonconjugated diene. Monoreactive nonconjugated dienes have a double bond which readily participates in the copolymerization reaction with ethylene and propylene and a second double bond which does not participate significantly in the copolymerization reaction. At a given diene content, copolymers of this class have a maximum side-chain unsaturation available for adduct formation. The gel content of these copolymers is also low, since minimum crosslinking takes place during the copolymerization. Suitable dienes are linear aliphatic nonconjugated dienes, e.g., 1,4-hexadiene, alkylidene bicycloalkenes, e.g., 5-ethylidene-2-norbornene, alkenyl bicycloalkenes, e.g., 5-alkenyl-2-norbornene, bicycloalkadienes, e.g., bicyclopentadiene, and alkenylcycloalkenes, e.g., vinyl cyclohexene. Another class of preferred impact-toughness promoting ethylene copolymers is branched tetrapolymers comprising ethylene, at least one $C_3$–$C_6$-α-monoolefin (preferably propylene), at least one monoreactive nonconjugated diene, and at least one direactive nonconjugated diene, e.g., 2,5-norbornadiene or 1,6-octadiene. By "direactive" is meant that both double bonds are capable of polymerization during the production of the polymer. Mixtures of the above-described ethylene copolymers are suitable as impact-toughness components.

The polyolefinic components of b), i.e., the propylene copolymer or the polypropylene and/or the impact-toughness promoting ethylene copolymer can be modified with polar groups if necessary, wherein the polar groups can be, in particular, acid compounds or derivatives of acid compounds. These polar groups preferably make up less than approximately 5 percent by weight, especially less than approximately 3 percent by weight, of the modified polyolefin. An improved compatibility is achieved between the nonpolar polyolefin phase and polyamide phase by means of the introduced functional groups. The improved compatibility results from interactions of the polar groups with the polyamide, wherein the interactions can comprise chemical reactions, hydrogen-bridge reactions and dipole-dipole interactions. The modified polyolefins can contain, e.g., unsaturated monocarboxylic acids or dicarboxylic acids or derivatives thereof in single-polymerized or grafted form. In this connection, the modifying comonomers can already be present during the production of the polyolefins by polymerization of olefins and, in this way, can be built into the growing polymer chain. The subsequent modification of the polyolefins is achieved, e.g., by conversion thereof with an unsaturated monocarboxylic acid or polycarboxylic acid or a derivative thereof in the presence of a radical source. The EPDM class mentioned above can be especially easily modified because of the side-chain unsaturation. Acrylic acid, methacrylic acid, maleic acid, maleic anhydride and fumaric acid are preferred as unsaturated monocarboxylic acids or polycarboxylic acids or their derivatives.

Since unmodified polyolefins and polyamides are generally incompatible, so that simple mixtures have no technically usable characteristics level, component b) can contain up to 40 percent by weight of a compatibilizer. For example, polyolefins which are modified with unsaturated carboxylic acids or derivatives of carboxylic acid, insofar as they do not fall into the compound classes mentioned under bb), serve as compatibilizers. In this connection, reference is had to EP-A-0 406 568 and EP-A-0 188 123. Also suitable are copolymers which contain styrene and ethylene butyl blocks and are preferably grafted with maleic anhydride, especially selectively hydrated styrene-butadiene-styrene block copolymers as described in EP-A-0 261 748.

Component b) has a MFI value (230° C., 2.16 kg) of approximately 0.5 to 7.0 g/10 min, especially approximately 1.0 to 4.0 g/10 min.

In a preferred embodiment form, the polymer mixture according to the invention contains, as an additional polymeric component, up to approximately 20 percent by weight, especially approximately 2 to 15 percent by weight, to 100 percent by weight of components a)+b), of a partially crosslinked TPE. Its MFI (230° C.; 10 kg) is approximately 5 to 30 g/10 min. For this purpose, partially crosslinked elastomer alloys of PP and EPDM are particularly suitable. The gel content is preferably approximately 10 to 70%. The addition of partially crosslinked TPEs especially improves the thermal dimensional stability.

In a further preferred embodiment form, the polymer mixture contains, in addition, up to approximately 20 percent by weight, especially approximately 2 to 15 percent by weight, to 100 percent by weight of components a)+b), of a polyethylene of very low density (VLDPE), i.e., a copolymer of ethylene with a $C_3$–$C_{12}$-α-olefin with a comonomer content of approximately 12 to 30 percent by weight. The comonomer is preferably 1-octene. The density is generally between approximately 0.860 and 0.905 g/cm$^3$. The addition of low-density polyethylene increases the flexibility of the sheeting and especially improves the peel elongation. At the same time, the weldability is increased because the softened sheet edges flow into one another better.

In another preferred embodiment form, the polymer mixture according to the invention additionally contains up to approximately 20 percent by weight to 100 percent by weight of components a)+b), of a high-density polyethylene (HDPE) with a density of approximately 0.933 to 0.968 g/cm$^3$, and a melt-flow index MFI (190° C., 2.16 kg) of approximately 0.2 to 5.0 g/10 min. The addition of high-density polyethylene brings about an improved thermal dimensional stability and favorable peeling strength and peeling force at high peeling elongation.

It is critical that the indicated MFI values of the components be maintained because the softened compounds must have sufficient strength for mechanical processing during the production process. On the other hand, the polymer mixture must possess sufficient flowability or fusability during the welding process.

Further, the polymer mixture according to the invention can contain added materials in a quantity in which the high-frequency weldability is not substantially affected. Examples of filler materials are calcium carbonate, calcium silicate, talc, silica, mica, and aluminum oxide. The filler materials can be used in quantities of up to 30 percent by weight with reference to the amount of polymeric constituents. Moreover, it is also possible to add other additives such as antiblocking agents, lubricants, light fastness agents, antioxidants, colorants, pigments, flameproofing agents or antistatic agents. The additives are normally contained in amounts of up to 30 percent by weight with respect to the amount of polymeric components.

The polymer mixture according to the invention can be produced in the following manner. The granulated raw materials are preferably mixed cold and fed to an extruder, preferably a double-screw extruder, and plasticized therein. The material is delivered, via a sheet die, in the form of sheet goods (sheeting) and is taken up by subsequent devices. Molded articles are obtained from the sheeting, for example, by deep drawing.

The polymer mixture according to the invention is especially suitable for the production of a sheet, especially a soft sheet, or molded articles by conventional methods. It is preferably used in the automobile sector for inside-roof lining, headrests, hand straps, backseat hat shelf, seat covers and back-cushion covers, and rear panelling or lining of front seats, sun visors, cargo space coverings, foot mats or side linings of doors. In addition, it is also possible to use the invention for luggage lining, in book bindings, etc.

DESCRIPTION OF THE PREFERRED EMBODIMENTS

The invention will be explained more fully in the following by means of examples.

EXAMPLES

The following useful materials are employed in the examples:

| | |
|---|---|
| EVA | ethylene vinyl acetate copolymer, MFI = 2.5 g/10 min (190° C., 2.16 kg); vinyl acetate content: 28 percent by weight; |
| TPO/PA: | polyamide-containing TPO, MFI = 3.0 g/10 min (230° C., 2.16 kg); polymer blend of approximately 15 percent by weight polyamide, approximately 8 percent by weight phase mediator, approximately 67 percent by weight block copolymer (42% PP/58% E/P); |
| TPE: | thermoplastic elastomers, PP/EPDM; MFI = 15 g/10 min (230° C., 10 kg); gel content approximately 30%; |
| VLDPE: | ethylene-1-octene copolymer, MFI = 0.5 g/0 min (190° C., 2.16 kg); octene content: 25 percent by weight; |
| HDPE: | high-density polyethylene, MFI = 0.8 g/10 min (190° C., 5 kg); density: 940 kg/m$^3$. |

The following properties were measured in the longitudinal and transverse directions in the sheets obtained in accordance with the following examples:

Tensile strength [MPa]: DIN 53455

Elongation at break [%]: DIN 53455

Shore hardness D: DIN 53505

The strength of the weld seams was tested in the longitudinal direction by measuring the peel force, peel strength and peel elongation at peel (using samples which were welded together along a width of 15 mm) with reference to DIN 53357. The characteristic values are compiled in Table 1.

COMPARISON EXAMPLE 1

EVA (60 parts by weight), TPE (20 parts by weight), VLDPE (10 parts by weight), and HDPE (10 parts by weight) are mixed in a drum mixer and then extruded in a double-screw extruder at 155° C. to form a sheet with a thickness of 0.7 mm.

Two sheets were welded at room temperature on a high-frequency welding installation with a G 4000 SD generator and KH 500 press, both manufactured by Kiefel. The following welding parameters were selected:

welding pressure: 1600 N welding time: 4 seconds welding voltage: 2100 V electrodes: 300×5 mm.

The physical-mechanical characteristics of the weld seams are compiled in Table 1.

COMPARISON EXAMPLE 2 AND EXAMPLES 3–7

The components indicated in Table 1 were mixed. The production of the sheet was carried out in a manner analogous to Comparison Example 1, except that the extruder temperature was increased to 180° C. Homogeneous sheets with the mechanical characteristics and weld seam characteristics indicated in Table 1 and with the indicated high-frequency welding behavior were obtained.

The sheet according to Comparison Example 1 shows excessive thermal expansion. As can be seen, the dielectric loss factor of the sheet according to Comparison Example 2 is highly dependent upon temperature. In contrast, the sheets according to the invention combine satisfactory physical-mechanical characteristics of sheeting and weld seams with a high dielectric loss factor which exhibits a small relative change with changes in temperature.

While the foregoing description and drawings represent the preferred embodiments of the present invention, it will be obvious to those skilled in the art that various changes and modifications may be made therein without departing from the true spirit and scope of the present invention.

TABLE 1

| Example | 1 | 2 | 3 | 4 | 5 | 6 | 7 |
|---|---|---|---|---|---|---|---|
| EVA | 60 | | 50 | 42 | 43 | 38 | 24 |
| TPO/PA | | 100 | 50 | 44 | 45 | 40 | 48 |
| TPE | 20 | | | 14 | | 12 | 8 |
| VLDPE | 10 | | | | 12 | 10 | 10 |
| HDPE | 10 | | | | | | 10 |
| Tensile strength [MPa] 1/q | 21.8 | 25.8 | 24.4 | 24.9 | 26.8 | 25.0 | 26.5 |
| | 18.2 | 16.4 | 17.4 | 18.0 | 18.2 | 17.4 | 17.5 |
| Elongation at tear [%] 1/q | 720 | 464 | 672 | 701 | 734 | 649 | 707 |
| | 650 | 735 | 667 | 722 | 707 | 685 | 741 |
| Shore D | 33 | 35 | 31 | 31 | 31 | 32 | 35 |
| Thermal expansion [%], longitudinal 110° C., 103 g, 60 min | 12 | 0 | 4 | 1 | 6 | 0 | 1 |
| Characteristics of weld seams | | | | | | | |
| Peel strength MPa, longitudinal | 6.2 | 19.2 | 8.6 | 4.9 | 5.6 | 5.1 | 6.4 |
| Peel force N, longitudinal | 63.7 | 200.4 | 90.7 | 51.8 | 58.1 | 60.0 | 66.7 |
| Peel elongation %, longitudinal | 397 | 235 | 460 | 215 | 341 | 302 | 354 |

TABLE 1-continued

| Example | 1 | 2 | 3 | 4 | 5 | 6 | 7 |
|---|---|---|---|---|---|---|---|
| High-frequency welding behavior | | | | | | | |
| Dielectric loss factor tan δ, 23° C. | 0.0188 | 0.0043 | 0.0230 | nd | nd | 0.0190 | nd |
| Dielectric loss factor tan δ, 60° C. | 0.0270 | 0.0160 | 0.0310 | nd | nd | 0.0230 | nd | nd = not determined

What is claimed is:

1. High-frequency-weldable polymer mixture comprising:
   a) approximately 1 to 80 percent by weight copolymer of ethylene with approximately 8 to 45 percent by weight comonomers selected from vinyl esters of saturated $C_2$–$C_8$ carboxylic acids, optionally with $C_1$–$C_{12}$-alkyl acrylates, -methacrylates, and carbon monoxide as termonomer, having a melt-flow index MFI (190° C.; 2.16 kg) of approximately 0.2 to 7.0 g/10 min; and
   b) approximately 20 to 99 percent by weight polyamide-containing thermoplastic polyolefin with a melt-flow index MFI (230° C. 2.16 kg) of approximately 0.5 to 7.0 g/10 min comprising:
      aa) approximately 3 to 50 percent by weight polyamide,
      bb) approximately 50 to 97 percent by weight polyolefin, which polyolefin (i) is a propylene copolymer of which approximately 10 to 95 percent by weight are one or more polypropylene blocks and approximately 90 to 5 percent by weight are one or more random copolymer blocks of ethylene, $C_3$–$C_{12}$-alphaolefin and, optionally, diene, wherein the ethylene content in the random copolymer blocks is approximately 50 to 95 percent by weight, or (ii) a mixture of a polypropylene and a copolymer of ethylene, $C_3$–$C_{12}$- alphaolefin and, optionally, diene, wherein the weight ratio of polypropylene to copolymer is approximately 9:1 to 1:9, or (iii) a mixture of (i) and (ii),
      cc) approximately 0 to 40 percent by weight compatibilizing agent, wherein the quantities of aa) to cc) add up to 100 percent by weight and are referenced to component b), and quantities a) and b) are referenced to the sum of a)+b).

2. The polymer mixture according to claim 1, which further contains from about 20 percent by weight to 100 percent by weight of components a)+b), a partially crosslinked TPE with a melt-flow index MFI (230° C.; 10 kg) of approximately 5 to 30 g/10 min.

3. The polymer mixture according to claim 1, which further contains from about 20 percent by weight to 100 percent by weight of components a)+b), of a copolymer of ethylene with approximately 12 to 30 percent by weight $C_3$–$C_{12}$-α-olefin with a melt-flow index MFI (190° C.; 2.16 kg) of approximately 0.2 to 7.0 g/10 min.

4. The polymer mixture according to claim 1, which further contains from about 20 percent by weight to 100 percent by weight of components a)+b) of a polyethylene with a density of 0.933 to 0.966 g/cm$^3$, and a melt-flow index MFI (190° C.; 2.16 kg) of approximately 0.2 to 5.0 g/10 min.

5. A sheet or molded article containing the polymer mixture according to claim 1.

6. A sheet or molded article containing the polymer mixture according to claim 2.

7. A sheet or molded article containing the polymer mixture according to claim 3.

8. A sheet or molded article containing the polymer mixture according to claim 4.

* * * * *